(12) United States Patent
Lee

(10) Patent No.: US 6,546,410 B1
(45) Date of Patent: Apr. 8, 2003

(54) HIGH-SPEED HEXADECIMAL ADDING METHOD AND SYSTEM

(75) Inventor: Weng Fook Lee, Santa Clara, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/481,548

(22) Filed: Jan. 10, 2000

Related U.S. Application Data

(60) Provisional application No. 60/165,907, filed on Nov. 16, 1999.

(51) Int. Cl.[7] ................................................. G06F 7/50
(52) U.S. Cl. ....................................... 708/670; 708/493
(58) Field of Search ................................ 708/629, 210, 708/673, 700, 670, 707, 708, 709, 710, 712, 714, 493; 341/105

(56) References Cited

U.S. PATENT DOCUMENTS 3,636,334 A * 1/1972 Svoboda ..................... 708/210
4,197,587 A * 4/1980 Stettmaier et al. ........... 708/673
4,228,520 A * 10/1980 Letteney et al. ............. 708/629
5,146,422 A * 9/1992 Maass et al. ................ 341/105

* cited by examiner

Primary Examiner—Chuong Dinh Ngo
Assistant Examiner—Chat C. Do
(74) Attorney, Agent, or Firm—Mikio Ishimaru

(57) ABSTRACT

Adder circuitry is provided based on a reduced mathematical method to provide high-speed hexadecimal addition. A first adder adds the least significant binary digits of two hexadecimal numbers to provide a Digit1 and a Dot1, and a second adder adds the second least significant binary digits to provide a Digit2 plus a Dot1 as a Sum2 and a CarryA. A secondary adder adds the Dot1 and the Sum2 to provide the sum of Digit2 plus Dot2 and Dot1 as a SumA. A generator generates a Dot2 of hexadecimal "1" for certain values of the Sum2 and the CarryA, and a detector triggers an output device, which outputs a hexadecimal "0", to output the Dot2 in response to a certain pattern of hexadcecimal numbers in the Dot1 and the Sum2. Thus, the least signifigant digit of the added hexadecimal numbers is Digit1, the second least significant digit is SumA, and the third least significant digit is the output of the output device.

27 Claims, 5 Drawing Sheets

HIGH-SPEED HEXADECIMAL ADDING METHOD AND SYSTEM

CROSS REFERENCE TO RELATED APPLICATION(S)

This application claims the benefit of U.S. Provisional Patent Application No. 60/165,907, filed on Nov. 16, 1999, which is incorporated herein by reference thereto.

TECHNICAL FIELD

The present invention relates generally to computer systems and more particularly to high-speed adder circuitry in and a method for such systems.

BACKGROUND ART

The "brain" of most computer systems is a microprocessor, the "brain" of most microprocessors is composed of arithmetic logic units (ALU), and the "brain" of an ALU is made up of adder circuitry. Basic adder circuits, or adders, are used in adder circuitry, and adder circuitry is used to build other circuitry for performing subtraction, multiplication, division, and other operations.

In the past, electronic digital circuitry having conventional logic elements were used as adder circuitry for adding two binary numbers together and providing the appropriate carry-out and carry-in operations. Typical types of adder circuitry include carry-ripple, conditional sum/carry-selection, and carry-look-ahead parallel adder circuitry.

The carry-ripple adder circuitry uses full adder logic circuitry having a first and a second summand input into the logic circuitry plus a carry-out signal from a previous bit as a third input into the logic circuitry. In this circuitry, the carry bit is propagated from the least significant bit to the most significant bit.

While the carry-ripple adder circuitry is extremely simple, the carry bit must propagate through each stage of the logic circuitry so there is a significant propagation delay which limits adding speed and which increases with large bit width adder circuitry.

The conditional sum/carry-selection adder circuitry uses fewer logic circuits than the carry-look-ahead parallel adder circuitry. It consists of conventional logic circuitry with switches to select particular logic levels. Two sums are calculated along with two sets of carries. One carries a carry-in signal to the summand as logic zero ("0") and the other carry assumes a carry-in signal to the summand as logic one ("1"). Based on the actual logic value of the carry-in signal, a correct sum signal and a carry-out signal is selected. The conditional sum/carry-selection adder circuitry uses less logic circuitry than the carry-look-ahead adder circuitry and therefore requires a small chip surface area to implement. However, it introduces propagation delays because a carry-in signal bit is propagated from the least significant bit to the most significant bit within each logic block. For wide-bit width adder circuitry, there is a significant propagation delay that limits circuit operation speed.

The carry-look-ahead adder circuitry is used to increase the operational speed for an arithmetic process. It uses standard full adder logic circuitry with a first set of input lines for each bit, plus a separate set of carry lines tied to the input lines to separately determine whether a carry will occur. For example, the carry-look-ahead circuit may evaluate the four low-order input bit signals of two 8-bit numbers being added together to determine if they will generate a carry-out from downstream full adder circuitry. The four higher order inputs can then be added together without having to wait for the carries to propagate through the low-order fill adder logic circuitry.

In the carry-look-ahead adder circuitry, each summand input signal is broken into input blocks with each input block being added independently with a carry-in signal and, if necessary, producing a carry-out signal. The carry-out signals are calculated through the use of logic carry-out blocks. The carry-out signal for each input block is calculated from each carry-out block from the summand input. The calculations are then cascaded together to form wider-bit adder circuitry.

The difficulty with the carry-look-ahead adder circuitry is the need for duplicative logic circuitry for implementing a summand input and a carry-out for each circuit stage. As the number of stages increases, the number of carry-out blocks increases exponentially. The increased stages increase the number of propagation delays for large-bit width adder circuitry and there is a significant increase in chip surface area needed to implement the adder circuitry. This increases the cost for incorporating the necessary logic circuitry for each circuit stage, and an increase in propagation delays that would cancel out initial increases in operational speed.

Essentially, current adder circuitry is subject to internal propagation delays that double each time the number of bits in the addition doubles. This makes current adder circuitry slower when the number of bits needed to perform the addition operation increases. For example, the addition of two 16-bit numbers requires 5 steps to obtain the result and, with each step requiring a 1-unit delay, the propagation delay would be 5 units. When two 32-bit numbers are being added, the current adder circuitry would require 9 steps to obtain the results, and the total delay would be 9 units. When the adder circuitry adds two 64-bit numbers, a total of 17 steps would be required for 17 units of delay.

Over the years, many different mathematical methods have been examined to determine a faster method of addition. Decades ago, a mathematical method was introduced by Jakow Trachtenberg which enabled very quick calculations to be made. However, the mathematical method was applied only to decimal calculations and did not appear to applicable to hexadecimal calculations which are used in computers. Thus, it was long believed that it would not be possible to use the Trachtenberg mathematical method for hexadecimal using computer systems.

Thus, the search has been long ongoing for faster adder circuitry. Unfortunately, it has been a considerable number of years since there have been any significant improvements in the architecture of the adder circuitry and it has not been thought possible by those skilled in the art to substantially increase the speed of basic adder circuitry.

DISCLOSURE OF THE INVENTION

The present invention provides a reduced mathematical method for adding two hexadecimal numbers by adding digits, placing the sums into a plurality of positions, identifying certain patterns, adding numbers in the plurality of positions, and using the identified patterns to derive the answer.

The present invention further provides a reduced mathematical method for adding two 8-bit hexadecimal numbers by adding digits, placing the sums into a plurality of positions, identifying certain patterns, adding numbers in the plurality of positions, and using the identified patterns to derive the answer by:

Adding the first least significant digits of two hexadecimal numbers and: if the answer of the addition is less than or equal to hexadecimal "F", placing the value of the addition in a Digit1 and placing a "0" in a Dot1; and, if the answer of the addition is greater than hexadecimal "F", placing the value of the addition without the carry in the Digit1 and placing a "1" in the Dot1.

Adding the second least significant digits and: if the answer of the addition is less than hexadecimal "F", placing the value of the addition in a Digit2 and placing a "0" in a Dot2; and, if the answer of the addition is greater than or equal to hexadecimal "F", subtracting the value of "1" from the value of the addition without the carry and placing this new value in the Digit2 and placing a "1" in the Dot2.

Determining the least significant hexadecimal digit, FSum1, as FSum1=Digit1.

Determining the second least significant digit, FSum2, as FSum2=Digit2+Dot2+Dot1=SumA.

Determining the third least significant digit, FCarry, by examining SumA for the certain pattern E_1_0. If the pattern E_1_0 is detected in SumA, then FCarry=hexadecimal "0". If the pattern E_1_0 is not detected in SumA, then FSum3=Dot2.

The present invention further provides a reduced mathematical method for adding two 16-bit hexadecimal numbers by adding digits, placing the sums into a plurality of positions, identifying certain patterns, adding numbers in the plurality of positions, and using the identified patterns to arrive at the answer by:

Adding the first least significant digits of two hexadecimal numbers and: if the answer of the addition is less than or equal to hexadecimal "F", placing the value of the addition in a Digit1 and placing a "0" in a Dot1; and, if the answer of the addition is greater than hexadecimal "F", placing the value of the addition without the carry in the Digit1 and placing a "1" in the Dot1.

Adding the second least significant digits and: if the answer of the addition is less than hexadecimal "F", placing the value of the addition in a Digit2 and placing a "0" in a Dot2; and, if the answer of the addition is greater than or equal to hexadecimal "F", subtracting the value of "1" from the value of the addition without the carry and placing this new value in the Digit2 and placing a "1" in the Dot2.

Adding the third least significant digits and: if the answer of the addition is less than hexadecimal "F", placing the value of the addition in the Digit3 and placing a "0" on Dot3; and, if the answer of the addition is greater than or equal to hexadecimal "F", subtracting the value of "1" from the value of the addition without the carry and placing this new value in the Digit3 and placing a "1" in the Dot3.

Adding the fourth least significant digits and: if the answer of the addition is less than hexadecimal "F", placing the value of the addition on Digit4 and placing a "0" on Dot4; and, if the answer of the addition is greater than or equal to hexadecimal "F", subtracting the value of "1" from the value of the addition without the carry and placing this new value on Digit4 and placing a "1" in the Dot4.

Determining the least significant hexadecimal digit, FSum1, as FSum1=Digit1.

Determining the second least significant digit, FSum2, as FSum2=Digit2+Dot2+Dot1=SumA.

Determining the third least significant digit, FSum3, by examining SumA for the certain pattern E_1_0. If the pattern E_1_0 is detected in SumA, then FSum3=Digit3+Dot3=Sum3. If the pattern E_1_0 is not detected in SumA, then FSum3=Digit3+Dot3+Dot2=SumB.

Determining the fourth least significant digit, FSum4, by examining SumB and SumA for the pattern E_1_0, and Sum3 for the pattern E_1. If the pattern E_1_0 detected in SumB, then FSum4=Digit4+Dot4=Sum4. If the pattern E_1_0 is detected in SumA and pattern E_1 is detected in Sum3, then FSum4=Digit4+Dot4=Sum4. If neither pattern is detected then FSum4=Digit4+Dot4+Dot3=SumC.

Determining the fifth least significant digit, Fcarry, by examining SumC, SumB, and SumA for the pattern E_1_0. If the pattern E_1_0 is detected in SumC, then FCarry=hexadecimal "0". If pattern E_1_0 is detected in SumB and pattern E_1 is detected in Sum4, then FCarry=hexadecimal "0". If pattern E_1_0 is detected in SumA, and pattern E_1 is detected in Sum4 and Sum3, then FCarry=hexadecimal "0". If none of the patterns is detected, then FCarry=Dot4.

The present invention further provides adder circuitry based on a reduced mathematical method to provide high-speed hexadecimal addition. A first adder adds the least significant binary digits of two hexadecimal numbers to provide a Digit1 and a Dot1, and a second adder adds the second least significant binary digits to provide a Digit2 plus a Dot2 as a Sum2 and a CarryA. A seondary adder adds the Dot1 and the Sum2 to provide the sum of Digit2 plus Dot2 and Dot1 as a SumA. A generator generates a Dot2 of hexadecimal "1" for certain values of the Sum2 and the CarryA, and a detector triggers an output device, which outputs a hexadecimal "0", to output the Dot2 in response to a certain pattern of hexadcecimal numbers in the Dot1 and the Sum2. Thus, the least signifigant digit of the added hexadecimal numbers is Digit1, the second least significant digit is SumA, and the third least significant digit is the output of the output device.

The present invention further provides adder circuitry based on a reduced mathematical method to provide high-speed hexadecimal addition. A first adder adds the least significant binary digits of two hexadecimal numbers to provide a Digit1 and a Dot1. A second adder adds the second least significant binary digits to provide a Digit2 plus a Dot2 as a Sum2 and a CarryA. A third adder adds the third least significant binary digits to provide a Digit3 plus a Dot3 as a Sum3 and a CarryB. A fourth adder adds the fourth least significant binary digits to provide a Digit4 plus a Dot4 as a Sum4 and a CarryC. A first secondary adder adds the Dot1 and the Sum2 to provide the sum of Digit2 plus Dot2 and Dot1 as a SumA. A first generator generates a Dot2 of hexadecimal "1" for certain values of the Sum2 and the CarryA. A second secondary adder adds the Dot2 and the Sum3 to provide the sum of Digit3 plus Dot3 and Dot2 as a SumB. A second generator generates a Dot3 of hexadecimal "1" for certain values of the Sum3 and the CarryB. A third secondary adder adds the Dot3 and the Sum4 to provide the sum of Digit4 plus Dot4 and Dot3 as a SumC. A third generator generates a Dot4 of hexadecimal "1" for certain values of the Sum4 and the CarryC. A first detector triggers a first output device, which outputs the Sum3, to output the SumB in response to a certain pattern of hexadcecimal numbers in the Dot1 and the Sum2. A second detector triggers a second output device, which outputs the Sum4, to output the SumC in response to a certain pattern of hexadcecimal numbers in the Dot2, Sum3, Dot1, and Sum2. A third detector triggers a third output device, which outputs a hexadecimal "0", to output the Dot4 in response to a certain pattern of hexadcecimal numbers in the Dot3, Sum4, Dot2, Sum3, Dot1, and Sum2. Thus, the least signifigant digit of the added hexadecimal numbers is Digit1; the second least significant digit is SumA; the third least significant digit is the output of the first output device; the fourth least significant digit is the output of the second output device; and the fifth least significant digit is the output of the third output device.

The above and additional advantages of the present invention will become apparent to those skilled in the art from a reading of the following detailed description when taken in conjunction with the drawings.

BEST MODES FOR CARRYING OUT THE INVENTION

Figure 1:
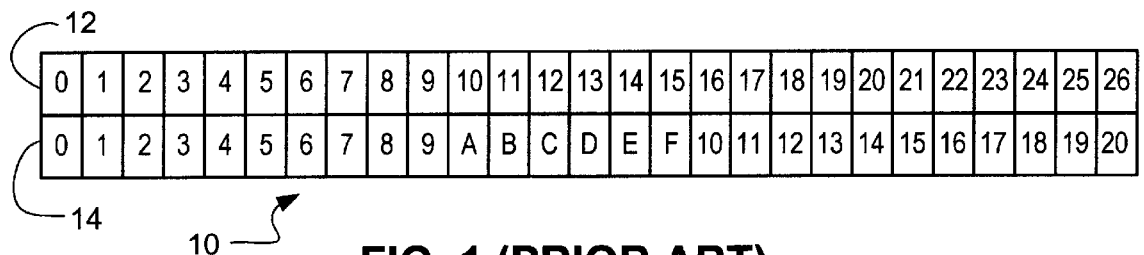
FIG. 1 (PRIOR ART) is a decimal to hexadecimal conversion chart.

Referring now to FIG. 1 (PRIOR ART), therein is shown a hexadecimal-decimal conversion chart 10 with the base ten decimal numbers 12 on top and their equivalent base sixteen hexadecimal numbers 14 on the bottom. The conversion chart 10 is provided as an easy reference to the numbers manipulated in the method provided herein.

Figure 2:
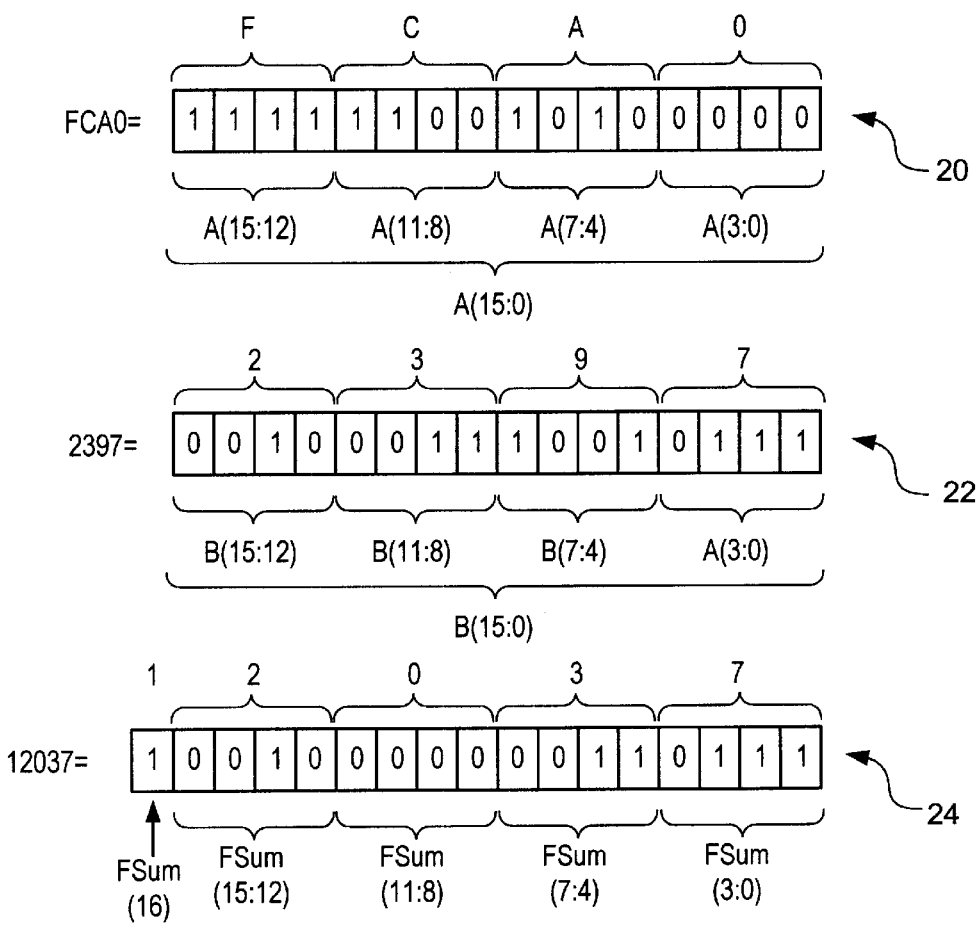
FIG. 2 (PRIOR ART) shows three binary registers used to add two hexadecimal numbers.

Referring now to FIG. 2 (PRIOR ART), therein are shown binary registers 20, 22, and 24 in a typical microprocessor (not shown) which respectively contain binary values for numbers A, B, and FSum. The numbers A and B represent two hexadecimal numbers to be added together. The hexadecimal numbers can have binary bit values which are powers of two, such as 8, 16, 32, 64, 128, etc. The method of the present invention is shown with reference to a system for adding 16-bit binary values. An 8-bit addition is a limited case of the 16-bit addition while 32-bit and above additions are extention cases which are of the same basic method and circuitry as would be evident to those skilled in the art.

As an example of the method, two numbers will be added. The first number in decimal notation is 64,672 and the second number in decimal notation is 9,111. The first number in hexadecimal notation is FCA0 and the second in hexadecimal notation is 2397. The hexadecimal number FCA0 is represented by a 16-bit binary value "A" and the hexadecimal number 2397 is represented by a 16-bit binary value "B". The FSum is the final sum from the addition of values A and B, and is a 17-bit binary value representing the hexadecimal value of 12037 which is equal to a decimal value of 73,783.

The FCA0 in hexadecimal notation is the same as "1111110010100000" in binary notation which is represented by the 16-bit binary value of the number A in register entries 15 through 0, or A(15:0), in the register 20. The individual register entries in the register 20 are:

A(15:12)=binary "1111"32 hexadecimal F
A(11:8)=binary "1100"=hexadecimal C
A(7:4)=binary "1010"=hexadecimal A
A(3:0)=binary "0000"=hexadecimal 0

The 2397 in hexadecimal notation is "0010001110010111" in binary notation which is represented by the 16-bit binary value of the number B in register entries 15 through 0, or B(15:0), in the register 22. The individual register entries in the register 22 are:

B(15:12)=binary "0010"=hexadecimal 2
B(11:8)=binary "0011"=hexadecimal 3
B(7:4)=binary "1001"=hexadecimal 9
B(3:0)=binary "0111"=hexadecimal 7

The "12037" in hexadecimal is "10010000000110111" in binary notation which is represented by the 17-bit binary value of the number FSum in register entries 16 through 0,or FSum(16:0), in the register 24. The individual register entries in the register 24 are:

FSum(16)=binary 1=hexadecimal 1 (this is the carry bit of final result)
FSum(15:12)=binary "0010"=hexadecimal 2
FSum(11:8)=binary "0000"=hexadecimal 0
FSum(7:4)=binary "0011"=hexadecimal 3
FSum(3:0)=binary "0111"=hexadecimal 7

Figure 3:
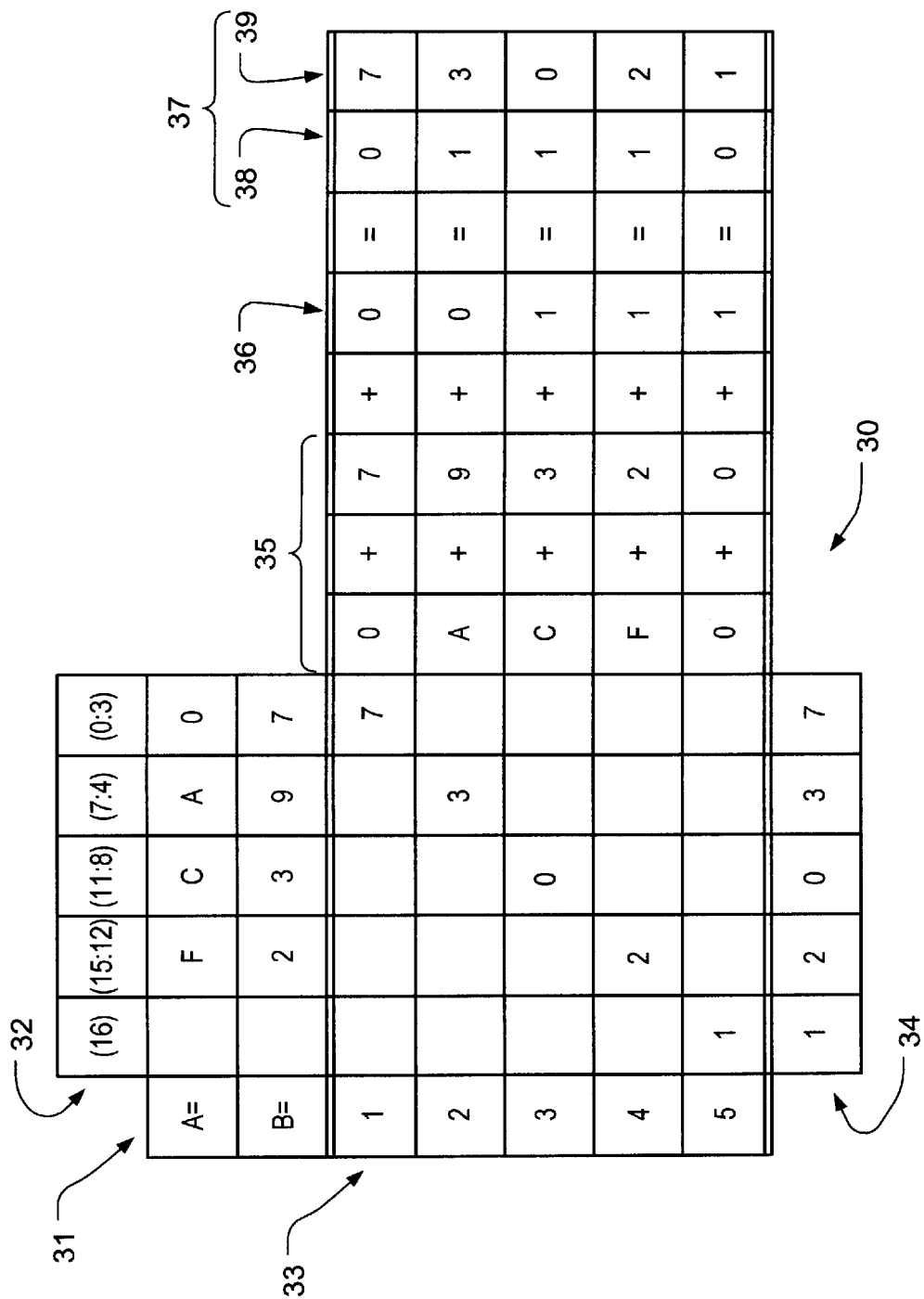
FIG. 3 (PRIOR ART) shows the prior art method for adding hexadecimal numbers.

Referring now to FIG. 3 (PRIOR ART), therein is shown a charted example of the prior art mathematical method 30. Again, the addition is of the hexadecimal numbers FCA0 and 2397 which equals hexadecimal 12037. Along the side are number rows 31 for the numbers A and B, and along the top are register columns 32 for registers (16), (15:12), (11:8), (7:4), and (3:0).

The individual steps in the mathematical method 30 are shown in column 33. For 16-bit calculations, there are five steps labeled 1–5. The FSum is shown in row 34.

For ease of understanding, the digits of numbers A and B are shown in column 35 and the carried digits in column 36. These equal the result column 37, which consists of a carry digit column 38 and a last digit column 39.

The mathematical method 30 is commonly implemented in computers using binary registers and by transmitting various signals between the registers and basic computing elements.

Figure 4:
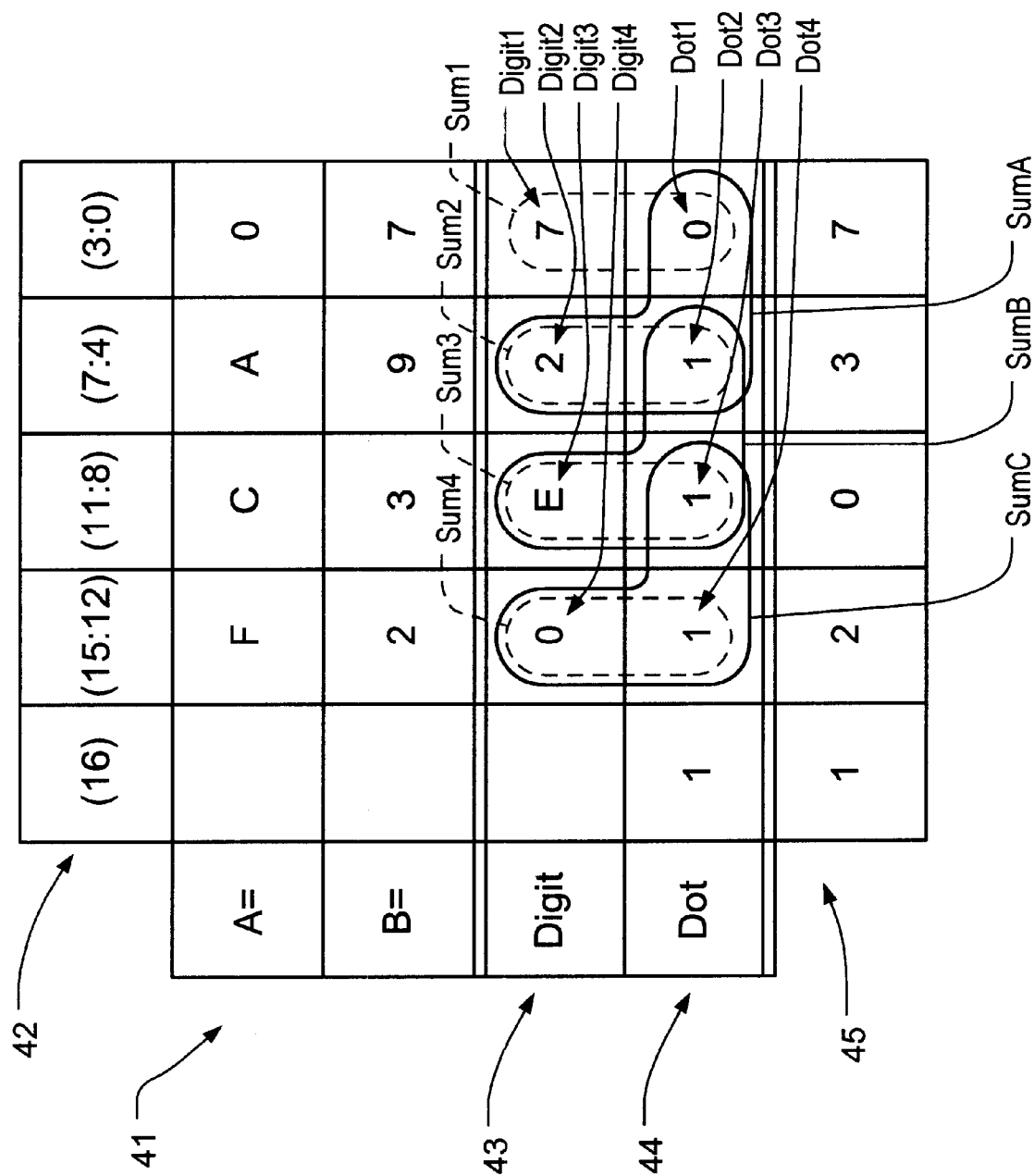
FIG. 4 shows the method of the present invention for adding hexadecimal numbers.

Referring now to FIG. 4, therein is shown a charted example of the reduced mathematical method 40 of the present invention. Again, the addition is of the hexadecimal numbers FCA0 and 2397 which equals 12037. Along the side are the number rows 41 for the numbers A and B, and along the top are register columns 42 for registers (16), (15:12), (11:8), (7:4), and (3:0) going from left to right.

The individual steps in the reduced mathematical method 40 are done in two steps, which are designated by a first row called the row Sum 43 and a second row called the row Dot 44. The FSum is shown in row 45.

For ease of understanding, the various groupings which must be identified and the individual summations are indicated in row Sum 43 by Digit4, Digit3, Digit2, and Digit1 going from left to right, and in row Dot 44 by Dot4, Dot3, Dot2, and Dot1 also going from left to right. The "Digit" is the least significant digit of the addition, or right digit, and the "Dot" is indicative of a Sum which requires or does not require a carry, either a 1 or a 0, respectively. The Dot terminology comes from the Trachtenberg method.

The groupings, where patterns are to be detected, are indicated in row Sum 43 and row Dot 44 by Sum4, Sum3, Sum2 and Sum1 from left to right. Sum1 is provided only for reference and is not used. For Sum4, Sum3, and Sum2, they are the numbers in the Sum and Dot in a single column. Thus, Sum4 consists of Digit 4 and Dot 4 represented by Digit4_Dot4; similarly Sum3 consists of Digit3_Dot3; and Sum2 consists of Digit2_Dot2. The critical numbers for the pattern of Digit and Dot of the present invention are E_1 in a Sum with a numeric designation. At the same time, Sum4=Digit4+Dot4; Sum3=Digit3+Dot3; and Sum2=Digit2+Dot2 for purposes of the operation of the present invention.

Additional groupings, where patterns are to be detected, are indicated in row Sum 43 and row Dot 44 by SumC, SumB, and SumA from left to right. The SumC, SumB, and SumA are the numbers in the Sum in a single column plus the Dot to the right of the single column. Thus, SumC refers to the numbers in Digit4_Dot4_Dot3; SumB refers to the numbers in Digit3_Dot3_Dot2; and SumA refers to the numbers in Digit2_Dot2_Dot1. The critical numbers for the pattern of the present invention are E_1_0 in a Sum with an alphabetic designation. At the same time, SumC=Digit4+Dot4+Dot3; SumB=Digit3+Dot3+Dot2; SumA=Digit2+Dot2+Dot1 for purposes of the operation of the present invention.

The various parts of the answer row FSum row 45 are designated by FCarry, FSum4, FSum3, FSum2, and FSum1 again going from left to right.

The reduced mathematical method 40 is implemented in computers using binary registers and by transmitting various signals between the registers and basic computing elements.

Figure 5:
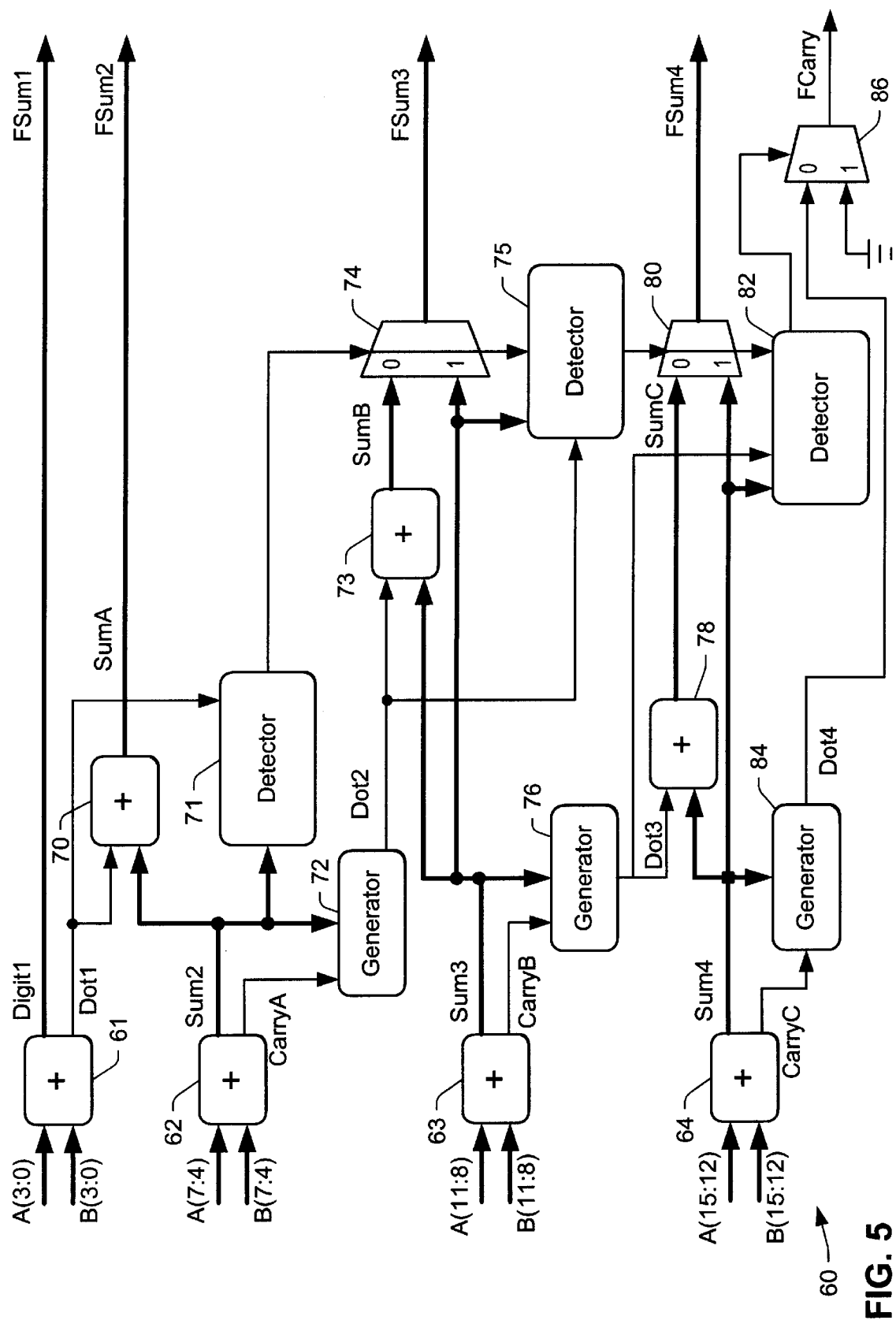
FIG. 5 shows a block diagram of a 16-bit adder of the present invention.

Referring now to FIG. 5, therein is shown a block diagram of a 16-bit adder circuitry 60 of the present invention which implements the reduced mathematical method 40 using conventional components and simplified circuitry.

The binary value signals of the hexadecimal numbers are input in parallel to a plurality of conventional 4-bit adder circuits, or adders, which for the 16-bit adder circuitry 60 would be four adders, first through fourth adders 61–64.

The first adder 61 has a first output which provides an output FSum1 and a second output which is connected to a conventional 4-bit adder, or first secondary adder 70, which has an output FSum2.

The second adder 62 has a first output connected to the first secondary adder 70, to a first detector 71, and to a first generator 72. The second adder 62 has a second output which is also connected to the first generator 72. The first detector 71 is also connected to receive the output from the second output of the first adder 61.

The third adder 63 has a first output which is connected to a second secondary adder 73 which has its first input from the first generator 72. The second secondary adder 73 adds the signals from the third adder 63 and the first generator 72 to provide a signal to a first multiplexer 74 which provides an output signal to output FSum3. The first multiplexer 74 is triggered by the first detector 71.

The third adder 63 further has the first output as the second input of the first multiplexer 74 and as an input to a second detector 75. The second detector 75 also receives an input from the first generator 72. The adder has the second output also going to a second generator 76. The second output of the third adder 63 also is inputted into the second generator 76.

The fourth adder 64 has a first output connected to a conventional 4-bit adder, third secondary adder 78, which has an output connected to a second multiplexer 80. The second multiplexer 80 is triggered by the second detector 75 to provide an output signal FSum 4.

The fourth adder 64 provides a first output signal to the third secondary adder 78, to the second multiplexer 80, and to a third detector 82. The third detector 82 receives input signals from the output of the second generator 76 and the second detector 75 through the second multiplexer 80.

The fourth adder 64 has a second output to third generator 84 which has an output connected to a third multiplexer 86. The third multiplexer 86 is triggered by the third detector 82 and has a ground input of hexadecimal "0". The third multiplexer 86 has an output signal FCarry.

Figure 6:
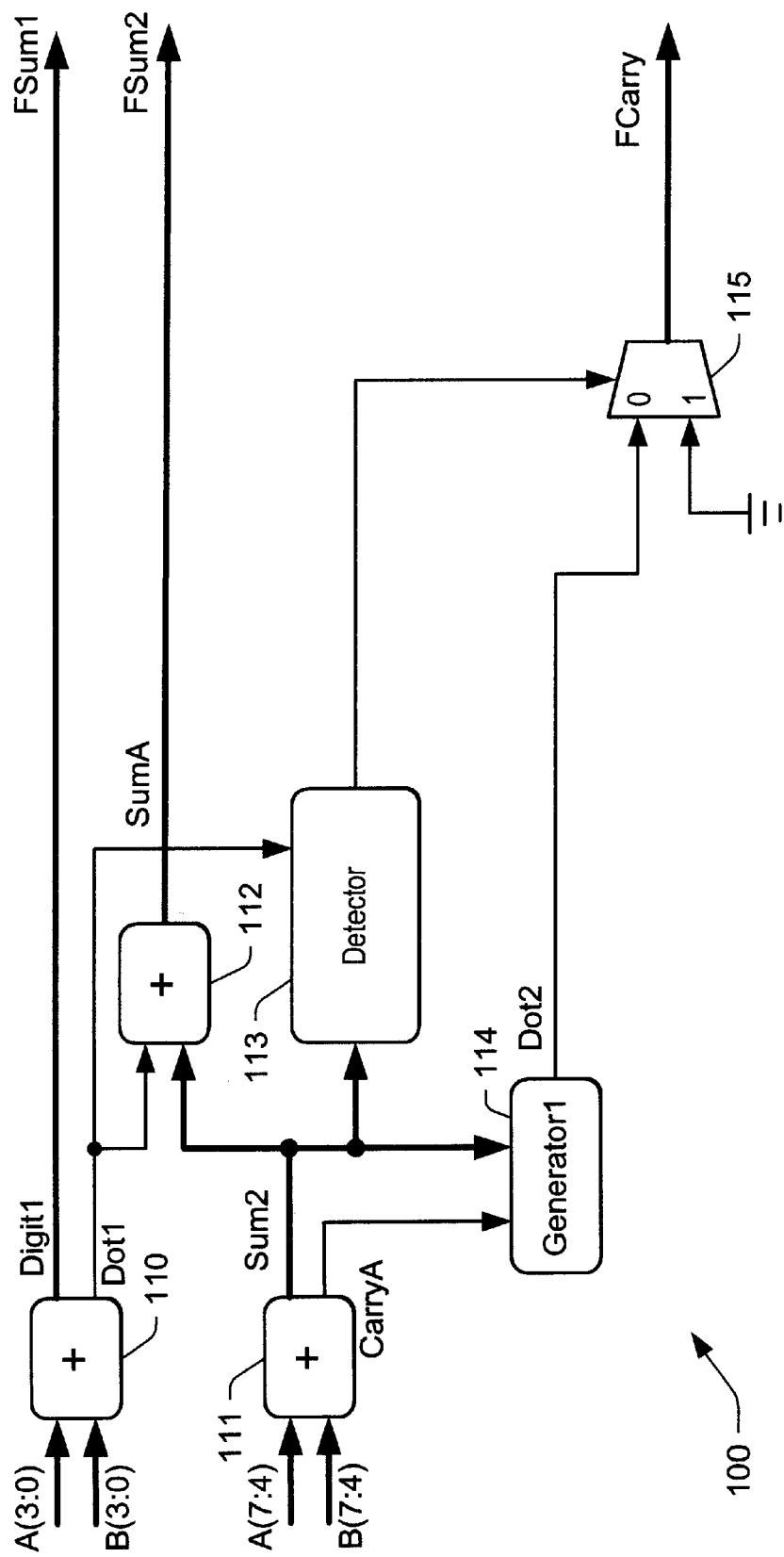
FIG. 6 shows a block diagram of an 8-bit adder of the present invention.

Referring now to FIG. 6, therein is shown a block diagram of an 8-bit adder circuitry 100 of the present invention which implements the reduced mathematical method 40 using conventional components and simplified circuitry. Based on the design of FIG. 5 for a 16-bit adder circuitry, an 8-bit adder circuitry can be constructed by obviously removing half of the circuitry in FIG. 5.

In FIG. 6, the binary signals representative of the hexadecimal numbers are input into a plurality of conventional 4-bit adders, which for an 8-bit adder circuitry 100 would be two adders 110 and 111.

The first adder 110 has a first output signal to FSum 1. The first adder 110 further has a second output to a secondary adder 112 which provides an output signal FSum2.

The second adder 111 has a first output to the secondary adder 112, to a detector 113, and to a first generator 114. The second adder 111 has a second output which is connected to the first generator 114. The output of the first generator 114 is connected to the "0" input of a multiplexer 115. The "1" input of the multiplexer 115 is connected to ground. The multiplexer 115 is triggered from the output of the detector 113 to provide an output signal FCarry.

Operation

The operation of the reduced mathematical method 40 for 8-bits is merely a shortened version of the 16-bit so the 16-bit system will be described in detail. Referring back to FIG. 4, the reduced mathematical method 40 uses the following steps to obtain a fast calculation of the final result of the addition of hexadecimal "FCA0" (represented by A(15:0)) and hexadecimal "2397" (represented by B(15:0)):

First, to obtain the values of the row Digit and the row Dot, the following steps are used:

1. Addition of the first set of values, A(3:0)+B(3:0):
    a. If the answer of the addition is less than or equal to hexadecimal "F", place the value of the addition in the Digit1 and place a "0" in the Dot1 .
    b. If the answer of the addition is greater than hexadecimal "F", place the value of the addition without the carry in the Digit1 and place a "1" in the Dot1.

In the example, where A(3:0) is hexadecimal "0" and B(3:0) is hexadecimal "7", then the addition of A(3:0)+B(3:0) is hexadecimal "7". Therefore, the Digit1 would be hexadecimal "7" and the Dot1 would be hexadecimal "0".

For another example, if A(3:0) is hexadecimal "3" and B(3:0) is hexadecimal "8", then the addition of A(3:0)+B(3:0) is hexadecimal "B". This is less than hexadecimal "F", therefore, the Digit1 would be hexadecimal "B" and the Dot1 would be hexadecimal "0".

For another example, if A(3:0) is hexadecimal "8" and B(3:0) is hexadecimal "A", then the addition of A(3:0)+B(3:0) is hexadecimal "12". This is greater than hexadecimal "F", therefore, the Digit1 would be hexadecimal "1" and the Dot1 would be hexadecimal "1".

2. Addition of the second set of values. A(7:4)+B(7:4).
    a. If the answer of the addition is less than hexadecimal "F", place the value of the addition in the Digit2 and place a "0" in the Dot2.

b. If the answer of the addition is greater than or equal to hexadecimal "F", subtract the value of "1" from the value of the addition without the carry and place this new value in the Digit2 and place a "1" in the Dot2.

In the example, where A(7:4) is hexadecimal "A" and B(7:4) is hexadecimal "9", then the addition of A(7:4)+B(7:4) is hexadecimal "13". This is greater than hexadecimal "F", therefore, the Digit2 would be hexadecimal "2" (hexadecimal "3" minus "1") and the Dot2 would be hexadecimal "1".

For another example, if A(7:4) is hexadecimal "3" and B(7:4) is hexadecimal "8", then the addition of A(7:4)+B(7:4) is hexadecimal "B". This is less than hexadecimal "F", therefore, the Digit2 would be hexadecimal "B" and the Dot2 would be hexadecimal "0".

For another example, if A(7:4) is represented by hexadecimal value of "8" and B(7:4) represented by a hexadecimal value of "7", then the addition of A(7:4)+B(7:4) is hexadecimal "F". This is equal to hexadecimal "F", therefore, the Digit2 would be hexadecimal "E" (hexadecimal "F" minus "1") and the Dot2 would be hexadecimal "1".

3. Addition of the third set of values, A(11:8)+B1(11:8):
  a. If the answer of the addition is less than hexadecimal "F", place the value of the addition in the Digit3 and place a "0" in the Dot3.
  b. If the answer of the addition is greater than or equal to hexadecimal "F", subtract the value of "1" from the value of the addition without the carry and place this new value in the Digit3 and place a "1" in the Dot3.

In the example, where A(11:8) is hexadecimal "C" and B(11:8) is hexadecimal "3", then the addition of A(11:8)+B(11:8) is hexadecimal "F". This equals hexadecimal "F", therefore, Digit3 would be hexadecimal "E" (hexadecimal "F" minus "1") and Dot3 would be hexadecimal "1".

For another example, if A(11:8) is hexadecimal "3" and B(11:8) is hexadecimal "8", then the addition of A(11:8)+B(11:8) is hexadecimal "B". This is less than hexadecimal "F", therefore Digit3 would be hexadecimal "B" and Dot3 would be hexadecimal "0".

In another example, if A(11:8) is hexadecimal "8" and B(11:8) is hexadecimal "A", then the addition of A(11:8)+B(11:8) is hexadecimal "12". This is greater than hexadecimal "F", therefore, Digit3 would be hexadecimal "1" (hexadecimal "2" minus "1") and Dot3 would be hexadecimal "1".

4. Addition of the fourth set of values, A(15:12)+B(15:12):
  a. If the answer of the addition is less than hexadecimal "F", place the value of the addition in the Digit4 and place a "0" in the Dot4.
  b. If the answer of the addition is greater than or equal to hexadecimal "F", subtract the value of "1" from the value of the addition without the carry and place this new value in the Digit4 and place a "1" in the Dot4.

In the example, where A(15:12) is hexadecimal "F" and B(15:12) is hexadecimal "2", then the addition of A(15:12)+B(15:12) is hexadecimal "11". This is greater than hexadecimal "F", therefore, Digit4 would be hexadecimal "0" and Dot4 would be hexadecimal "1".

For another example, if A(15:12) is hexadecimal "B" and B(15:12) is hexadecimal "0", then the addition of A(15:12)+B(15:12) is hexadecimal "B". This is less than hexadecimal "F", therefore, Digit4 would be hexadecimal "B" and Dot4 would be hexadecimal "0".

For another example, if A(15:12) is hexadecimal "9" and B(15:12) is hexadecimal "A", then the addition of A(15:12)+B(15:12) is hexadecimal "13". This is greater than hexadecimal "F", therefore, Digit4 would be hexadecimal "2" (hexadecimal "3" minus "1") and Dot4 would be hexadecimal "1".

For another example, if A(15:12) is represented by the hexadecimal value of "8" and (15:12) is represented by a hexadecimal value of "7", then the addition of A(15:12)+(15:12) is hexadecimal "F". This is equal to hexadecimal "F", therefore, the Digit4 would be hexadecimal "E" (hexadecimal "F" minus "1") and the Dot4 would be hexadecimal "1".

The above calculations of the values for the row Digit and row Dot are summarized for the FIG. 4 example as follows:
1. For the Digit1 and the Dot1:
   A(3:0)+B(3:0)=hexadecimal "0"+hexadecimal "7"= hexadecimal "7" Therefore, Digit1 is hexadecimal "7" and Dot1 is hexadecimal "0".
2. For the Digit2 and the Dot2:
   A(7:4)+B(7:4)=hexadecimal "A"+hexadecimal "9"= hexadecimal "13" Therefore, Digit2 is hexadecimal "2" (obtained from hexadecimal "3" minus "1") and Dot2 is hexadecimal "1".
3. For the Digit3 and the Dot3:
   A(11:8)+B(11:8)=hexadecimal "C"+hexadecimal "3"= hexadecimal "F" Therefore, Digit3 is hexadecimal "E" (obtained from hexadecimal "F" minus "1") and Dot3 is hexadecimal "1"
4. For the Digit4 and the Dot4:
   A(15:12)+B(15:12)=hexadecimal "F"+hexadecimal "2"=hexadecimal "11" Therefore, Digit4 is hexadecimal "0" (obtained from hexadecimal "1" minus "1") and Dot4 is hexadecimal "1".

Second, to obtain the final answer or sum, FSum (16:0), of the addition of hexadecimal value of "FCA0" as represented by 16-bit binary A(15:0) and hexadecimal value of "2397" as represented by 16-bit binary B(15:0), the final 17-bits of results of the addition are shown below:
1) To obtain the FSum1 or FSum(3:0):
   FSum1=Digit1=hexadecimal "7"=hexadecimal "7"
2) To obtain the FSum2 or FSum(7:4):
   FSum2=Digit2+Dot2+Dot1=SumA.
   In the example,
   FSum2=Digit2+Dot2+Dot1=hexadecimal "2"+ hexadecimal "1"+hexadecimal "0"=hexadecimal "3"
3) To obtain the FSum3 or FSum(11:8):
   SumA is examined for the pattern E_1_0.
     i) If the pattern E_1_0 is detected in SumA, then FSum3=Digit3+Dot3=Sum3.
     ii) If the pattern E_1_0 is not detected in SumA, then FSum3=Digit3+Dot3 +Dot2=SumB.
   In the example, the SumA pattern is E_1_1 so the pattern E_1_0 is not detected in SumA, thus:
   FSum3=Digit3+Dot3+Dot2=hexadecimal "E"+ hexadecimal "1"+hexadecimal "1"=hexadecimal "0"
4) To obtain the FSum4 or FSum(15:12):
   SumB and SumA are examined for the pattern E_1_0, and Sum3 is examined for the pattern E_1.
     i) If the pattern E_1_0 detected in SumB, then FSum4=Digit4+Dot4=Sum4.
     ii) If the pattern E_1_0 is detected in SumA and the pattern E_1 is detected in Sum3, then FSum4= Digit4+Dot4=Sum4.
     iii) If (i) or (ii) are not detected then FSum4=Digit4+ Dot4+Dot3=SumC.

In the example, the SumB pattern is E_1 1, the SumA pattern is 2_1_0, and the Sum2 pattern is 2_1. The pattern E_1_0 is not detected in SumB or SumA and the pattern E_1 is not detected in Sum2, thus:

FSum4=Digit4+Dot4+Dot3=hexadecimal "0"+ hexadecimal "1"+hexadecimal "1"=hexadecimal "2"

5) To obtain the FCarry or FSum(16):

Sum C, SumB, and SumA are examined for the pattern E_1_0, and
 i) If the pattern E_1_0 is detected in SumC, then FCarry=hexadecimal "0".
 ii) If pattern E_1_0 is detected in SumB and pattern E_1 is detected in Sum4, then FCarry=hexadecimal "0".
 iii) If pattern E_1_0 is detected in SumA, and pattern E_1 is detected Sum4 and Sum3, then FCarry= hexadecimal "0".
 iv) If (i), (ii) or (iii)are not detected, then FCarry=Dot4.

Here, the SumC pattern is 0_1_1, the SumB pattern is E_1_1, the Sum4 pattern is 0_1, and the Sum3 pattern is E_1. The pattern E_1_0 is not detected in SumC or SumB, and the pattern E_1 is not detected in Sum4 or Sum3, thus:

FCarry=Dot4=hexadecimal "1".

The above steps may be simplified as follows:
1) FSum1=Digit1
2) FSum2=Sum2
3) FSum3=Sum3, if E_1_0 is detected in SumA
   FSum3=SumB, if E_1_0 is not detected in SumA
4) FSum4=Sum4, if E_1_0 is detected in SumB or if E_1_0 is detected in
   SumA and E_1 is detected in Sum3
   FSum4=SumC, if none of the above are detected
5) FCarry=0, if E_1_0 is detected in SumC or if E_1_0 is detected in SumB and E_1 is detected in Sum4 or if E_1_0 is detected in SumA and E_1 is detected in Sum4 and Sum3
   FCarry=Dot4, if none of the above are detected To transform this mathematical method into a high-speed circuit design, several steps can first be taken to optimize the circuit of the design. The following steps are taken for simplification of the transformation of the 16-bit mathematical method into a circuit design:
1) Sum1=Digit1+Dot1
2) Sum2=Digit2+Dot2
3) Sum3 Digit3+Dot3
4) Sum4=Digit4+Dot4
5) SumA=Sum2+Dot1=Digit2+Dot2+Dot1
6) SumB=Sum3+Dot2=Digit3+Dot3+Dot2
7) SumC=Sum4+Dot3=Digit4+Dot4+Dot3

Referring back to FIG. 5, the 16-bit adder circuitry 60 has the hexadecimal signals for the numbers to be added provided to the adders 61–64.

The binary signals representative of the hexadecimal numbers in A(3:0) and B(3:0) are added in the first adder 61 which produces the Digit1 and Dot1 outputs. The binary signals representative of the hexadecimal number in A(7:4) and B(7:4) are added in the second adder 62 which provides the Sum1 and a CarryA. The binary signals representative of the hexadecimal number in A(11:8) and B(11:8) are added in the third adder 63 to provide the Sum2 and a CarryB. The binary signals representative of the hexadecimal numbers A(15:12) and B(15:12) are added in the fourth adder 64 to provide the Sum3 and a CarryC.

It should be noted that the reduced mathematical method 40 refers to the subtraction of "1" from different steps in its operation. The circuitry for subtraction does not appear in either the 16-bit or 8-bit adder circuitry. Essentially, for the addition of the second set of hexadecimal numbers A(7:4) plus B(7:4), if the value of the addition is greater than or equal to hexadecimal "F", the step calls for subtracting "1" and placing the value in the Digit2. This would place a "1" in Dot2. However, for the final calculation of FSum2, either Sum2 or SumA is used. Regardless of which is used, whether FSum2=Sum2 or FSum2=SumA, Digit2 is still added back by Dot2. Since Sum2=Digit2+Dot2 and SumA= Digit2+Dot2+Dot1, this means the requirement of subtracting "1" does not need to appear in the circuitry. It is required by the mathematical method 40 but it may be avoided when using the method in circuitry. This provides a shortcut in the circuitry which will make reduced mathematical method adder circuitry even faster.

It will also be understood that CarryA, CarryB, and CarryC are artifacts of using conventional 4-bit adders. A conventional 4-bit adder provides a result and a carry which are used to generate Dot values in the 16-bit adder circuitry 60.

The Digit1 from the first adder 61 becomes the FSum1 output. The Dot1 output from the first adder 61 and the Sum1 output from the second adder 62 are added in the first secondary adder 70 to provide a SumA output which becomes the FSum2 output.

The Sum1 and the CarryA outputs from the second adder 62 are used by the first generator 72 to provide the Dot2 output. When the CarryA is "1", Digit2=Sum2−1 and Dot2= 1. When the CarryA is "0" and the Sum2=F, Digit2=Sum2−1 and Dot2=1. When neither of these conditions is met, Digit2=Sum2 and Dot2=0.

The Sum2 and the CarryB outputs of the third adder 63 are used by the second generator 76 to provide the Dot3 output. When the CarryB is "1", Digit3=Sum3−1 and Dot3= 1. When the CarryB is "0" and the Sum3=F, Digit3 Sum3−1 and Dot3=1. When neither of these conditions is met, Digit3=Sum3 and Dot3=0.

The Sum3 and CarryC outputs of the fourth adder 64 are used by the third generator 84 to provide the Dot4 output. When the CarryC is "1", Digit4=Sum4−1 and Dot4=1. When the CarryC is "0" and the Sum4=F, Digit4=Sum4−1 and Dot4=1. When neither of these conditions is met, Digit4=Sum4 and Dot4=0.

The Dot2 output of the first generator 72 and the Sum2 output of the third adder 63 are added in a second secondary adder 73 to provide the SumB output.

The Dot3 output of the second generator 76 and the Sum3 output of the fourth adder 64 are added in the third secondary adder 78 to provide the SumC output.

The Dot1 output and the Sum1 output are used by the first detector 71 to determine if the E_1_0 pattern exists. On Sum2 and Dot1, Sum3 from the third adder 63 will be output as FSum3. If the first detector 71 does not detect the E_1_0 on Sum2 and Dot1, the first multiplexer 74 will be triggered to provide SumB from the second secondary adder 73 as the FSum3 output.

The fourth adder 64 has the first output as a Sum4 which is provided to an third secondary adder 78 where it is added with the Dot3 which is generated by the second generator 76. The third secondary adder 78 provides a SumC output to the second multiplexer 80 which has as its other input Sum4 from the fourth adder 64. The second multiplexer 80 is triggered by the second detector 75. If the second detector 75 detects the E_1_0 pattern on Sum2 and Dot1 and the E_1 pattern on Sum3, or the E_1_0 pattern on Sum3 and Dot2, the multiplexer will output Sum4 as the FSum4 output. If the second detector 75 does not detect any of the patterns, SumC will be output as the FSum4 output.

The fourth adder 64 has a second output which is CarryC provided to the generator 84. The generator 84 uses the Sum4 to generate the Dot4 which is provided to the input of the third multiplexer 86. The third multiplexer 86 is triggered by the detectors 82, 81 and 80 whereby the E__1__0 pattern on Sum2 and Dot1 AND E__1 pattern on Sum3 AND E__1 pattern on Sum4; E__1__0 pattern on Sum3 and Dot2 and E__1 pattern on Sum4; or E__1__0 pattern on Sum4 and Dot3 to trigger Dot3 as an output of the multiplexer 42 to be the output FCarry. If none of the aforegoing occurs, FCarry will be the ground potential.

The FSum1, FSum2, FSum3, FSum4, and FCarry are hexadecimal signals which are the result of adding the hexadecimal numbers.

Referring back to FIG. 6, the 8-bit adder circuitry 100 has the binary signals representative of the hexadecimal numbers entered into the adders 110 and 111. The inputs A(3:0) and B(3:0) are added in the first adder 110 and provide a first output which is the Digit1 which becomes the output FSum1.

The binary signal representative of the hexadecimal number A(7:4) and B(7:4) are added in the second adder 111 to produce the Sum1 which is added with the Dot1 in the secondary adder 112 to output SumA which becomes the FSum2 output.

The CarryA and the Sum1 are used by the generator 114 to produce the Dot2 which is provided to the multiplexer 115. The multiplexer 115 has its other input connected to ground. The multiplexer 115 is triggered by the detector 113 which is responsive to the detector 113 detecting an E__1__0 pattern on Sum1 and Dot1 to have the Dot2 output become the FCarry output. The multiplexer 115 is further responsive to the lack of the pattern to provide a "0" as the FCarry.

The present invention has been described for 8-bit and 16-bit reduced mathematical methods and adder circuitry, but it would be obvious to those having ordinary skill in the art that the present invention can be used for 32, 64, 128, 256, and above bits merely by replicating the basic 8-bit and 16-bit method and adder circuitry described herein.

While the invention has been described in conjunction with specific best modes, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. Adder circuitry for adding two hexadecimal numbers comprising:
   a first adder for adding the first least significant hexadecimal digits of two hexadecimal numbers to provide a Digit1 and Dot1, the Digit1 being the first least significant hexadecimal digit of the addition of the two hexadecimal numbers;
   a second adder for adding the second least significant hexadecimal digits of the two hexadecimal numbers and providing a Sum2 and a CarryA;
   a generator for receiving the Sum2 and the CarryA and generating a Dot2;
   a secondary adder for adding the Dot1 and the Sum2 and providing a SumA, the SumA being the second least significant hexadecimal digits of the addition of the two hexadecimal numbers;
   a detector for receiving the Sum2 and the Dot1 to provide a triggering output in response to a predetermined pattern of the Sum2 and Dot1; and
   an output device responsive to the presence of the triggering output to provide the Dot2 as the third least significant digit of the addition of the two hexadecimal numbers.

2. The adder circuitry as claimed in claim 1 wherein the detector is responsive to the predetermined pattern of the Sum2 including a hexadecimal "E" and a "1" and the Dot1 including a hexadecimal "0" to provide the triggering output to cause the output device to provide the Dot2 as the third least significant digit of the addition of the two hexadecimal numbers.

3. The adder circuitry as claimed in claim 1 wherein the generator is responsive to the Sum2 equal to a hexadecimal "F" or the CarryA equal to a hexadecimal "1" to provide a Dot2 equal to hexadecimal "1".

4. The adder circuitry as claimed in claim 1 wherein the generator is responsive to the absence of the Sum1 being equal to a hexadecimal "F" and the CarryA equal to a hexadecimal "1" to provide a Dot2 equal to hexadecimal "0".

5. The adder circuitry as claimed in claim 1 wherein the output device is responsive to the absence of the triggering output to provide a hexadecimal "0" as the third least significant digit of the addition of the two hexadecimal numbers.

6. The adder circuitry as claimed in claim 1 wherein the first and second adders are 4-bit adders.

7. The adder circuitry as claimed in claim 1 wherein the output device is a multiplexer.

8. Adder circuitry for adding two hexadecimal numbers comprising:
   a first adder for adding the first least significant hexadecimal digits of two hexadecimal numbers to provide a Digit1 and Dot1, the Digit1 being the first least significant hexadecimal digit of the addition of the two hexadecimal numbers;
   a second adder for adding the second least significant hexadecimal digits of the two hexadecimal numbers to provide a Sum2 and a CarryA;
   a third adder for adding the third least significant hexadecimal digits of the two hexadecimal numbers to provide a Sum3 and a CarryB;
   a fourth adder for adding the fourth least significant hexadecimal digits of the two hexadecimal numbers to provide a Sum4 and a CarryC;
   a first generator for using the Sum2 and the CarryA to generate a Dot2;
   a second generator for using the Sum3 and the CarryB to generate a Dot3;
   a third generator for using the Sum4 and the CarryC to generate a Dot4;
   a first secondary adder for adding the Sum2 and the Dot1 to provide a SumA, the SumA being the second least significant hexadecimal digits of the addition of the two hexadecimal numbers;
   a second secondary adder for adding the Sum3 and the Dot2 to provide a SumB;
   a third secondary adder for adding the Sum4 and the Dot3 to provide a SumC;
   a first detector for receiving the Sum2 and the Dot1 to provide a first triggering output in response to a predetermined pattern of the Sum2 and Dot1;
   a second detector for receiving the Sum3, the Dot2, and the first triggering output to provide a second triggering output in response the first triggering output or to a predetermined pattern of the Sum3 and Dot2;

a third detector for receiving the Sum4, the Dot3, the first triggering output, and the second triggering output to provide a third triggering output in response to the first triggering output, the second triggering output, or a predetermined pattern of the Sum4 and Dot2;

a first output device responsive to:
the presence of the first triggering output to provide the SumB as the third least significant digit of the addition of the two hexadecimal numbers and the absence of the first triggering output to provide the Sum3 as the third least significant digit of the addition of the two hexadecimal numbers;

a second output device responsive to:
the presence of the first or second triggering output to provide the SumC as the fourth least significant digit of the addition of the two hexadecimal numbers and the absence of the first or second triggering output to provide the Sum4 as the fourth least significant digit of the addition of the two hexadecimal numbers; and a third output device responsive to the presence of the first, second, or third triggering output to provide theDot4 as the fifth least significant digit of the addition of the two hexadecimal numbers.

9. The adder circuitry as claimed in claim 8 wherein the first detector is responsive to the predetermined pattern of the Sum2 including a hexadecimal "E" and a hexadecimal "1" and the Dot1 including a hexadecimal "0" to provide the first triggering output to cause the first output device to provide the SumB as the third least significant digit of the addition of the two hexadecimal numbers.

10. The adder circuitry as claimed in claim 8 wherein the second detector is responsive to the predetermined pattern of the Sum3 including a hexadecimal "E" and a hexadecimal "1" and the Dot2 including a hexadecimal "0" to provide the second triggering output to cause the second output device to provide the SumC as the third least significant digit of the addition of the two hexadecimal numbers.

11. The adder circuitry as claimed in claim 8 wherein:
the second detector is responsive to:
the predetermined pattern of the Sum2 including a hexadecimal "E" and a hexadecimal "1" and the Dot1 including a hexadecimal "0" and the predetermined pattern of the Sum3 including a hexadecimal "E" and a hexadecimal "1", or
the predetermined pattern of the Sum3 including a hexadecimal "E" and a hexadecimal "1" and the Dot2 including a hexadecimal "0" to provide the second triggering output to cause the second output device to provide the SumC as the fourth least significant digit of the addition of the two hexadecimal numbers.

12. The adder circuitry as claimed in claim 8 wherein:
the third detector is responsive to the predetermined pattern of the Sum4 including a hexadecimal "E" and a hexadecimal "1" and the Dot3 including a hexadecimal "0" and the predetermined pattern of the Sum3 to provide the third triggering output to cause the third output device to provide the Dot4 as the fifth least significant digit of the addition of the two hexadecimal numbers.

13. The adder circuitry as claimed in claim 8 wherein:
the third detector is responsive to:
the predetermined pattern of the Sum2 including a hexadecimal "E" and a "1" and the Dot1 including a hexadecimal "0" and the predetermined pattern of the Sum3 including a hexadecimal "E" and a hexadecimal "1" or the predetermined pattern of the Sum3 including a hexadecimal "E" and a "1" and the Dot2 including a hexadecimal "0" and the predetermined pattern of the Sum4 including a hexadecimal "E" and a hexadecimal "1", or the predetermined pattern of the Sum4 including a hexadecimal "E" and a "1" and the Dot3 including a hexadecimal "0" to provide the third triggering output to cause the third output device to provide the Dot4 as the fifth least significant digit of the addition of the two hexadecimal numbers.

14. The adder circuitry as claimed in claim 8 wherein the first generator is responsive to Sum2 equal to a hexadecimal "F" or the CarryA equal to a hexadecimal "1" to provide a Dot2 equal to a hexadecimal "1".

15. The adder circuitry as claimed in claim 8 wherein the second generator is responsive to Sum3 equal to a hexadecimal "F" or the CarryB equal to a hexadecimal "1" to provide a Dot3 equal to a hexadecimal "1".

16. The adder circuitry as claimed in claim 8 wherein the third generator is responsive to Sum4 equal to a hexadecimal "F" or the CarryC equal to a hexadecimal "1" to provide a Dot4 equal to a hexadecimal "1".

17. The adder circuitry as claimed in claim 8 wherein the first generator is responsive to the absence of the Sum2 equal to a hexadecimal "F" or the CarryA equal to a exadecimal "1" to provide a Dot2 equal to a hexadecimal "0".

18. The adder circuitry as claimed in claim 8 wherein the second generator is responsive to the absence of the Sum3 equal to a hexadecimal "F" or the CarryB equal to a hexadecimal "1" to provide a Dot3 equal to a hexadecimal "0".

19. The adder circuitry as claimed in claim 8 wherein the third generator is responsive to the absence of the Sum4 equal to a hexadecimal "F" or the CarryC equal to a hexadecimal "1" to provide a Dot4 equal to a hexadecimal "0".

20. The adder circuitry as claimed in claim 8 wherein the first output device is responsive to the absence of the first triggering output to provide the Sum3 as the third least significant digit of the addition of the two hexadecimal numbers.

21. The adder circuitry as claimed in claim 8 wherein the second output device is responsive to the absence of the second triggering output to provide the Sum4 as the fourth least significant digit of the addition of the two hexadecimal numbers.

22. The adder circuitry as claimed in claim 8 wherein the third output device is responsive to the absence of the third triggering output to provide a hexadecimal "0" as the fifth least significant digit of the addition of the two hexadecimal numbers.

23. The adder circuitry as claimed in claim 8 wherein the first, second, third, and forth adders are 4-bit adders.

24. The adder circuitry as claimed in claim 8 wherein the first, second, and third output devices are multiplexers.

25. A method for adding two hexadecimal numbers having binary register values of A(7:0) and B(7:0) comprising the steps of:
adding A(3:0) and B(3:0) and:
placing the value of the addition in a Digit1 register and placing a "0" in a Dot1 register where the answer of the addition is less than or equal to hexadecimal "F", and
placing the value of the addition without the carry in the Digit1 register and placing a "1" in the Dot1 register where the answer of the addition is greater than hexadecimal "F";

adding A(7:4) and B(7:4) and:
  placing the value of the addition in a Sum2 register and placing a "0" in a Dot2 register where the answer of the addition is less than or equal to hexadecimal "F", and
  subtracting the value of "1" from the value of the addition without the carry and placing the subtracted value in the Digit2 register and placing a "1" in the Dot2 register where the answer of the addition is greater than or equal to hexadecimal "F";
outputting the Digit1 register as the first least significant digit of the addition of two hexadecimal numbers;
outputting the sum of the Digit2, Dot2, and Dot 1 registers as the second least significant digit of the addition of the two hexadecimal numbers; and
outputting the Dot2 register as the third least significant digit of the addition of two hexadecimal numbers where the Digit2 register contains a hexadecimal "E", the Dot2 register contains a hexadecimal "1", and the Dot1 register contains a hexadecimal "0".

26. A method for adding two hexadecimal numbers having binary register values of A(7:0) and B(7:0) comprising the steps of:
  adding A(3:0) and B(3:0), and:
    placing the value of the addition in a Digit1 register and placing a "0" in a Dot1 register where answer of the addition is less than or equal to hexadecimal "F", and
    placing the value of the addition without the carry in the Digit1 register and placing a "1" in the Dot1 register where the answer of the addition is greater than hexadecimal "F";
  adding A(7:4) and B(7:4), and:
    placing the value of the addition in a Digit2 register and placing a "0" in a Dot2 register where the answer of the addition is less than or equal to hexadecimal "F", and
    subtracting the value of "1" from the value of the addition without the carry and placing the subtracted value in the Digit2 register and placing a "1" in the Dot2 register where the answer of the addition is greater than or equal to hexadecimal "F";
  adding A(11:8) and B(11:8), and:
    placing the value of the addition in a Digit3 register and placing a "0" in a Dot3 register where the answer of the addition is less than hexadecimal "F", and
    subtracting the value of "1" from the value of the addition without the carry and placing the subtracted value in the Digit2 register and placing a "1" in the Dot2 register where the answer of the addition is greater than or equal to hexadecimal "F";
  adding A(15:12) and B(15:12), and:
    placing the value of the addition in a Digit4 register and placing a "0" in a Dot4 register where the answer of the addition is less than hexadecimal "F", and
    subtracting the value of "1" from the value of the addition without the carry and placing the subtracted value in the Digit4 register and placing a "1" in the Dot4 register where the answer of the addition is greater than or equal to hexadecimal "F";
outputting the Digit1 register as the first least significant digit of the addition of the two hexadecimal numbers;
outputting:
  the sum of the Digit2 and Dot2 registers as the second least significant digit of the addition of the two hexadecimal numbers where the Digit2 register contains a hexadecimal "E", the Dot2 register contains a hexadecimal "1", and the Dot1 register contains a hexadecimal "0";
  the sum of the Digit2, Dot2, and Dot1 registers as the second least significant digit of the addition of the two hexadecimal numbers where the Digit2 register does not contain a hexadecimal "E", the Dot2 register does not contain a hexadecimal "1", and the Dot1 register does not contain a hexadecimal "0";
outputting:
  the sum of the Digit3 and Dot3 registers as the third least significant digit of the addition of the two hexadecimal numbers where the Digit2 register contains a hexadecimal "E", the Dot2 register contains a hexadecimal "1", and the Dot1 register contains a hexadecimal "0";
  the sum of the Digit3, Dot3, and Dot2 registers as the third least significant digit of the addition of the two hexadecimal numbers where the Digit3 register does not contain a hexadecimal "E", the Dot3 register does not contain a hexadecimal "1", and the Dot2 register does not contain a hexadecimal "0";
outputting:
  the sum of the Digit4 and Dot4 registers as the fourth least significant digit of the addition of the two hexadecimal numbers where the Digit3 register contains a hexadecimal "E", the Dot3 register contains a hexadecimal "1", and the Dot2 register contains a hexadecimal "0";
  the sum of the Digit4 and Dot4 registers as the fourth least significant digit of the addition of the two hexadecimal numbers where the Digit2 register contains a hexadecimal "E", the Dot2 register contains a hexadecimal "1", and the Dot1 register contains a hexadecimal "0" and the Digit3 register contains a hexadecimal "E" and the Dot3 register contains a hexadecimal "0"; or
  the sum of the Digit4, Dot4, and Dot3 registers as the fourth least significant digit of the addition of the two hexadecimal numbers where the Digit2 register does not contain a hexadecimal "E", the Dot2 register does not contain hexadecimal "1", and the Dot1 register does not contain hexadecimal "0" and the Digit3 register does not contain a hexadecimal "E" and the Dot3 register does not contain hexadecimal "0";
outputting a hexadecimal "0" as the fifth least significant digit of the addition of the two hexadecimal numbers where:
  the Digit4 register contains a hexadecimal "E", the Dot4 register contains a hexadecimal "1", and the Dot3 register contains a hexadecimal "0";
  the Digit3 register contains a hexadecimal "E", the Dot3 register contains a hexadecimal "1", and the Dot2 register contains a hexadecimal "0"; or
  the Digit2 register contains a hexadecimal "E", the Dot2 register contains a hexadecimal "1", and the Dot1 register contains a hexadecimal "0" and the Digit4 and Digit3 registers contain a hexadecimal "E" and the Dot 4 and Dot3 registers contain a hexadecimal "0".

27. The method as claimed in claim 26 including the step of outputting a hexadecimal "1" as the fifth least significant digit of the addition of the two hexadecimal numbers where:
  the Digit4 register does not contain a hexadecimal "E", the Dot4 register does not contain a hexadecimal "1", and the Dot3 register does not contain a hexadecimal "0";

the Digit3 register does not contain a hexadecimal "E", the Dot3 register does not contain a hexadecimal "1", and the Dot2 register contains a hexadecimal "0"; or the Digit2 register contains a hexadecimal "E", the Dot2 register contains a hexadecimal "1", and the Dot1 register contains a hexadecimal "0" and the Digit4 and Digit3 registers contain a hexadecimal "E" and the Dot 4 and Dot3 registers contain a hexadecimal "0".

* * * * *